United States Patent
Eoff et al.

(10) Patent No.: US 6,764,981 B1
(45) Date of Patent: Jul. 20, 2004

(54) WELL TREATMENT FLUID AND METHODS WITH OXIDIZED CHITOSAN-BASED COMPOUND

(75) Inventors: Larry S. Eoff, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/394,898

(22) Filed: Mar. 21, 2003

(51) Int. Cl.[7] .................................................. C09K 7/02
(52) U.S. Cl. ....................... 507/110; 507/111; 507/120; 507/121; 507/211; 507/212; 507/225; 507/226; 536/20
(58) Field of Search ............................ 536/20; 507/110, 507/111, 120, 121, 211, 212, 225, 226

(56) References Cited

U.S. PATENT DOCUMENTS

| | | | | |
|---|---|---|---|---|
| 5,538,730 A | * | 7/1996 | Romeo et al. ............. | 424/401 |
| 5,836,392 A | | 11/1998 | Urlwin-Smith ............. | 166/295 |
| 6,258,755 B1 | | 7/2001 | House et al. ............... | 507/110 |
| 6,267,893 B1 | | 7/2001 | Luxemburg ................. | 210/723 |
| 6,277,792 B1 | * | 8/2001 | House ........................ | 507/110 |
| 6,291,404 B2 | | 9/2001 | House ........................ | 507/110 |
| 6,358,889 B2 | * | 3/2002 | Waggenspack et al. ..... | 507/110 |
| 6,562,762 B2 | * | 5/2003 | Cowan et al. .............. | 507/110 |
| 2002/0143172 A1 | * | 10/2002 | Ookawa et al. .............. | 536/56 |

FOREIGN PATENT DOCUMENTS

JP    2000-256404    *    9/2000

* cited by examiner

*Primary Examiner*—Philip C. Tucker
(74) *Attorney, Agent, or Firm*—Robert A. Kent; Todd E. Albanesi

(57) ABSTRACT

The present invention provides a well treatment fluid that contains water, an oxidized chitosan-based compound, and a water-soluble compound having carbonyl groups, wherein the oxidized chitosan-based compound has the property of being soluble in water up to about 2 wt % while maintaining a viscosity of less than about 1000 cp. The water used for the well treatment fluid is selected from the group consisting of fresh water, seawater, natural brine, formulated brine, 2% KCl solution, and any mixtures in any proportion thereof. The present invention also provides a method of treating a subterranean formation penetrated by a wellbore comprising the steps of: (a) forming the well treatment fluid, and (b) contacting the subterranean formation with the fluid.

38 Claims, No Drawings

WELL TREATMENT FLUID AND METHODS WITH OXIDIZED CHITOSAN-BASED COMPOUND

FIELD OF THE INVENTION

The invention relates to aqueous well fluids containing an oxidized chitosan-based compound and to methods of drilling and servicing wells using such fluids.

BACKGROUND OF THE INVENTION

As hydrocarbon-producing wells mature, water production becomes a serious problem. Remediation techniques for controlling water production are generally referred to as conformance control. Remediation techniques are selected on the basis of the water source and the method of entry into the wellbore. Conformance control treatments include sealant treatments and relative permeability modifiers (also referred to as disproportionate permeability modifiers).

In previous years, water-soluble chromium (+3) crosslinked polyacrylamide gels have been used in conformance control treatments. The gel time was usually controlled by the addition of materials that chelate with chromium in competition with the polymer-bound carboxylate groups. The crosslinking reactions in these gel systems take place by the complexation of Cr (+3) ions with carboxylate groups on the polymer chains. Because of the nature of the chemical bond between Cr (+3) and the pendant carboxylate groups, formation of insoluble chromium species can occur at high pH values. Other problems with these systems include thermal instability, unpredictable gel time, and gel instability in the presence of chemical species that are potential ligands.

Another water-based gel system for conformance control is based on phenol/formaldehyde crosslinker system for homo-, co-, and ter-polymer systems containing acrylamide. The crosslinking mechanism involves hydroxymethylation of the amide nitrogen, with the subsequent propagation of crosslinking by multiple alkylation on the phenolic ring. Because of the nature of this chemical bond, the gel time is controllable over a wide temperature range. Although these gels work well, phenol and formaldehyde are highly toxic.

U.S. Pat. No. 5,836,392 discloses a system based on a polyethyleneimine (PEI) crosslinker and a copolymer of acrylamide and t-butyl acrylate (PA-t-BA). PEI is such a low-toxicity material that it has been approved in the United States by the Food and Drug Administration for food contact. Although non-toxic, PEI may bio-accumulate or persist in the environment for long periods.

Recently, U.S. Pat. No. 6,291,404 and U.S. Pat. No. 6,258,755, disclose the use of chitosan as a non-toxic, biodegradable component for use in drilling fluids. Chitosan's usefulness as a crosslinker has been limited, however, by its relative insolubility in aqueous solutions. For example, commercial sources of chitosan are only sparingly soluble in water; about 1% active solutions are the highest concentrations that can be made while maintaining usable viscosity. Therefore, chitosan has only been used at low concentrations as crosslinkers in conformance gels. While this is a step forward in the effort to provide more environmentally-acceptable systems, the major component of such a gel system is still a non-biodegradable polymer.

SUMMARY OF THE INVENTION

The present invention provides a well treatment fluid containing water, an oxidized chitosan-based compound, and a water-soluble compound having carbonyl groups. The oxidized chitosan-based compound has the property of being soluble in water at greater than about 2 wt % while maintaining a viscosity of less than about 1000 centipoise (cp). According to one embodiment, the water-soluble compound having carbonyl groups includes an acrylamide-based polymer. According to another embodiment, the water-soluble compound having carbonyl groups includes an oxidized starch. The present invention also provides a method of treating a subterranean formation penetrated by a wellbore comprising the steps of: (a) forming the well treatment fluid, and (b) contacting the subterranean formation with the fluid.

These and other embodiments of the present invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims. The compositions can comprise, consist essentially of, or consist of the stated materials. The method can comprise, consist essentially of, or consist of the stated steps with the stated materials.

DETAILED DESCRIPTION

In general, the present invention provides a well treatment fluid containing water, an oxidized chitosan-based compound, and a water-soluble compound having carbonyl groups. In one embodiment, the oxidized chitosan-based compound includes oxidized chitosan. The well treatment fluid of the present invention is useful as a well drilling and servicing fluid in various operations such as drilling, fracturing, sand control, lost circulation control, completion, workover, and the like.

The present invention relates to aqueous conformance control fluids and treatments. The water used for the well treatment fluid can be of any convenient source, including fresh water, seawater, natural brine, formulated brine, 2% KCl solution, and any mixtures in any proportion thereof. Formulated brine is manufactured by dissolving one or more soluble salts in water, natural brine, or seawater. Representative soluble salts are the chloride, bromide, acetate and formate salts of potassium, sodium, calcium, magnesium and zinc. The preferred water for the well treatment fluid of the present invention is 2% KCl solution.

Although chitosan has been used in aqueous conformance control, its usefulness has been severely limited by its relative poor solubility in water. Chitosan is a beta-(1→4)-polysaccharide of D-glucosamine, and is structurally similar to cellulose, except that the C-2 hydroxyl group in cellulose is substituted with a primary amine group in chitosan. Chitosan occurs in nature in small amounts and is biodegradable. Chitosan degrading enzymes, namely chitonases, chitosanases, and lysozymes that degrade chitin-derived materials occur in bacteria, fungi, algae mammals, birds, fish, etc. The biodegradability of chitosan is comparable to hydroxyethylcellulose (HEC). In-house Biochemical-Oxygen-Demand (BOD) and Chemical-Oxygen-Demand (COD) tests show a BOC/COD of 54% compared to 32% for HEC (according to HACH Method 8000 that is described in the HACH Water Analysis Handbook, 3rd ed., Hach Company (1997)).

Chitosan is a partially or fully deacetylated form of chitin. Chitin is a naturally occurring polysaccharide, which is the second most abundant natural product on earth preceded only by cellulose. Structurally, chitin is a polysaccharide consisting of beta-(1→4)2-acetamido-2-deoxy-D-glucose units, some of which are deacetylated. Chitin is not one polymer with a fixed stoichiometry, but a class of polymers of N-acetylglucosamine with different crystal structures and degrees of deacetylation and with fairly large variability from species to species. Typically, chitosan has a degree of deacetylation that is between 50% and 100%. The degree of deacetylation in the commercially available chitosan is usually in the 70 to 78% range.

The large number of free amine groups (pKa=6.3) makes chitosan a polymeric weak base. However, because chitosan is a polysaccharide containing many primary amine groups, it forms water-soluble salts with many organic and inorganic acids. For example, chitosan is somewhat more soluble in dilute aqueous acids, usually carboxylic acids, as the chitosonium salt. Nevertheless, the solubility of chitosan in acidified water, for example in acetic or hydrochloric acid, is still only in the 1 to 2% range. If the pH of the solution is increased above 6.0, precipitation of chitosan occurs, inhibiting solubility of chitosan. The viscosity of aqueous chitosan depends on the molecular weight of the polymer.

To overcome the relative insolubility of the chitosan, the present invention employs oxidized chitosan-based compounds in well treatment fluids. Oxidized chitosan-based compounds have the property of being soluble in water at greater than about 2 wt % while maintaining a viscosity of less than about 1000 cp. Tap water is used to measure the solubility of the oxidized chitosan-based compound. In one embodiment, the oxidized chitosan-based compound includes oxidized chitosan. Preferably, the oxidized chitosan-based compound has the property of being soluble in water at a pH of about 4 to about 7 and at standard temperature and pressure (STP). Furthermore, the oxidized chitosan-based compound preferably has the property of being soluble in water up to at least about 10 wt %.

Chitosan-based compounds suitable for oxidation can be comprised of or further include chitosan-based compounds selected from the group consisting of chitosan, chitosan salts of mineral or organic acids. Some commercial examples of chitosan include Chitosan Lactate which is available from Vanson HaloSource and Hydagen HCMF which is available from Cognis.

To oxidize the chitosan-based compound, a wide variety of oxidizers can be used. Examples of oxidizers include sodium hypochlorite, sodium chlorite, sodium persulfate, sodium periodate, hydrogen peroxide, organic peroxides, peracetic acid, and any mixture in any proportion thereof. The selection of the oxidizer and the concentration of oxidizer should be sufficient to oxidize or degrade the chitosan-based compound to a desired solubility. Without being limited by the theoretical explanation, the solubility of chitosan-based compounds is increased by dividing the chitosan-based compound into shorter polymer chain segments. Increased solubility of the chitosan-based compound may also be explained by the introduction of carboxyl groups.

Oxidized chitosan-based compounds are non-toxic and biodegradable. The oxidized chitosan-based compound reacts or crosslinks with water-soluble compounds having carbonyl groups. The present invention advantageously provides an oxidized chitosan-based compound, a material derived from natural sources, to crosslink with a variety of polymers over a broad temperature range and produce gels for conformance applications. The oxidized chitosan-based compound can be crosslinked with a variety of polymers that include, but are not limited to the water-soluble compound having carbonyl groups, namely polyacrylamide, or alkyl acrylate polymers. Gels ranging from stiff and ringing type to "lipping" gels are obtained.

In one embodiment of the present invention, the water-soluble compound having carbonyl groups includes an acrylamide-based polymer. Acrylamide-based polymers suitable for use in the present invention are saturated or unsaturated acrylamide-based polymers. In a preferred embodiment, the acrylamide-based polymer of this invention is selected from the group consisting of partially hydrolyzed polyacrylamide (PHPA), a copolymer of acrylamide and t-butyl acrylate (PA-t-BA), acrylic acid/amps copolymer (AMPS/AA), and mixtures thereof. However, other acrylamide-based polymers that have the ability to crosslink with the oxidized chitosan-based compound can also be used in the present invention.

In another embodiment of the invention, the water-soluble compound having carbonyl groups includes oxidized starch. Starch suitable for oxidation as in the present invention can include a number of starch-based compounds. In one embodiment, the starch is selected from the group consisting of corn starch, potato starch, waxy maize, dextrinized starch and any mixtures in any proportion thereof. A wide variety of oxidizers can be used to oxidize starch. Examples of oxidizers that can be used in the present invention are selected from the group consisting of sodium hypochlorite, sodium periodate, hydrogen peroxide, peracetic acid, and any mixture in any proportion thereof. It is understood by those skilled in the art that related polysaccharides, other than oxidized starch, can be used to crosslink with the oxidized chitosan-based compound, including oxidized cellulose, oxidized agarose, oxidized partially-acetylated cellulose, oxidized gums and combinations thereof. Other compounds that can be used include dialdehyde starch (DAS), dialdehyde cellulose, and combinations thereof.

The concentration of the oxidized chitosan-based compound in the fluids is selected to be sufficient to impart to the fluids with the desired rheological characteristics. In one advantageous embodiment, the oxidized chitosan-based compound is present in the amount of up to at least about 10 wt % of the water. Higher concentrations of the oxidized chitosan-based compound can be possible. At such high concentration of the oxidized chitosan-based compound in the well treatment fluid, the oxidized chitosan-based compound serves as the base polymer. Thus, the present invention not only provides a well treatment fluid that uses the oxidized chitosan-based compound as a crosslinker for synthetic polymers having carbonyl groups, the oxidized chitosan-based compound can also be used as a base polymer that can be crosslinked using other crosslinkers. This is a further step forward in the development of an environmentally acceptable system since the major component is the oxidized chitosan-based compound—a natural, non-toxic polymer. To further illustrate the present invention, and not by way of limitation, the following examples are provided.

The oxidized chitosan-based compound can be crosslinked with the acrylamide-based polymer. For example, the ratio of oxidized chitosan-based compound to the acrylamide-based polymer can be from about 15:1 to about 1:15. Such ratios of oxidized chitosan to acrylamide-based polymers provide a well treatment fluid that uses the oxidized chitosan-based compound as a base polymer and the water-soluble compound having carbonyl groups as the crosslinker. Thus, the bio-degradability of the oxidized chitosan-based compound/acrylamide-based polymer combination is enhanced by using the oxidized chitosan-based compound as the base polymer and the acrylamide-based polymer as the crosslinker.

EXAMPLE 1

Table 1 shows that the oxidized chitosan-based compound can be crosslinked with PA-t-BA and PHPA according to the principles of the present invention. These systems result in the same rigid type of gel typically seen with chromium-based gel systems. Also illustrated in Table 1 are very practical gel times in hours for the gel systems. All weight percents in the examples are relative to the water.

TABLE 1

Oxidized Chitosan-based Compound (7 wt %) as a Base Polymer Crosslinked with PA-t-BA and PHPA at 190° F.

| Crosslinker | wt % Crosslinker | Gel Time (HRS) |
|---|---|---|
| PA-t-BA | 2 | 26 |
| PA-t-BA | 3 | 23 |
| PA-t-BA | 4 | 19 |
| PHPA | 0.5 | 14 |
| PHPA | 2 | 10 |
| PHPA | 3 | 4 |

EXAMPLE 2

The oxidized chitosan-based compound can be used as the base polymer and PA-t-BA as the crosslinker, as presented in Table 2. The results show that the formulations tested do form gels. The gel time is considerably longer when sterically hindered PA-t-BA was used as the crosslinker compared to an acrylamide homopolymer. Base polymer to crosslinker ratio and temperature effects the gel time. Without being limited by any theoretical explanation, it appears the gel time with oxidized chitosan-based compound/acrylamide-based polymer combinations are more strongly influenced by temperature than the polymer/crosslinker ratios, or the corresponding concentrations especially at temperatures higher than 200 F. This observation may be indicative of the sterically hindered environment of the amino group in the oxidized chitosan-based compound.

TABLE 2

Gel Times in 2% KCl with Oxidized Chitosan-based Compound as the Base polymer and PA-t-BA as Crosslinkers at a pH of 5.9

| Crosslinker | % Chitosan-based Compound/% Crosslinker | Temp (F) | Gel Time Hrs |
|---|---|---|---|
| PA-t-BA | 5%/1% | 190 | 28 |
| PA-t-BA | 5%/1% | 230 | 2 |
| PA-t-BA | 5%/2% | 190 | 22 |
| PA-t-BA | 5%/3% | 190 | 19 |
| PA-t-BA | 5%/3% | 230 | 2 |
| PA-t-BA | 5%/4% | 190 | 18 |
| PA-t-BA | 5%/4% | 210 | 4 |
| PA-t-BA | 5%/4% | 230 | 1 |
| PA-t-BA | 7%/2% | 190 | 20 |
| PA-t-BA | 7%/3% | 190 | 23 |
| Acrylamide homopolymer | 7%/4% | 190 | 19 |
| Acrylamide homopolymer | 7%/0.5% | 190 | 14.2 |
| Acrylamide homopolymer | 7%/2% | 190 | 9.7 |
| Acrylamide homopolymer | 7%/3% | 190 | 4.3 |

In another embodiment, the oxidized chitosan-based compound is used as the crosslinker for the base polymer. The base polymer that can be crosslinked with the oxidized chitosan-based compound can be an acrylamide-based polymer or oxidized starch.

In one embodiment, the acrylamide-based polymer is present in the amount of up to about 10 wt % of the water. In such embodiments, the acrylamide-based polymer serves as the base polymer that is crosslinked with the oxidized chitosan-based compound. It is understood by those skilled in the art that both the oxidized chitosan-based compound and the water-soluble compound having carbonyl groups can serve as either the base polymer or crosslinker. Thus, if the oxidized chitosan-based compound is in a lower concentration than the water-soluble compound having carbonyl groups, the oxidized chitosan-based compound can serve as a crosslinker to the water-soluble compound having carbonyl groups.

In order to improve the relative overall bio-degradability of the gel compositions, starch may be oxidized to different degrees to introduce carbonyl groups, and the resulting products can be reacted or crosslinked with the oxidized chitosan-based compound. In one embodiment, the oxidized chitosan-based compound is present in the amount of up to about 10 wt % of the water. In such embodiments, the oxidized starch serves as the crosslinker to the oxidized chitosan-based compound. In one aspect of this embodiment, the ratio of oxidized chitosan-based compound to oxidized starch is from about 1:20 to about 20:1.

In one embodiment, the oxidized starch is present in the amount of up to about 10 wt % of the water. In such embodiments, the oxidized starch serves as the base polymer and the oxidized chitosan-based compound serves as the crosslinker. Since the chitosan-based compound is typically more expensive than starch, the economic aspects of bio-degradability can be improved by using oxidized starch as the base polymer and the oxidized chitosan-based compound as the crosslinker.

EXAMPLE 3

Initial experiments were directed to using the chitosan-based compound as the base polymer and the oxidized starch as the crosslinker. The compositions yielded gels and the results are presented in Table 3. The degree of starch oxidation also effected the gel time in a predictable manner. For example, when the degree of starch oxidation is high (higher level of carbonyl formation), the gel time is shorter than when the degree of oxidation is low.

TABLE 3

| Starch/Oxidizer Ratio | % Chitosan-based Compound/% Starch | Temp.(F) | pH | Gel Time(HRS) |
|---|---|---|---|---|
| 50/1 | 5%/2% | 160 | 4.9 | 1 |
| 50/1 | 5%/2% | 160 | 4.9 | 8 |
| 50/1 | 5%/1.5% | 160 | 4.9 | None in 65 hrs |
| 36/1 | 5%/2% | 160 | 4.9 | 4.8 |
| 36/1 | 5%/1.5% | 160 | 4.9 | 23 |
| 36/1 | 5%/1% | 160 | 4.9 | None in 63 hrs |
| 50/1 | 5%/2% | 160 | 4.9 | 8 |
| 50/1 | 5%/2% | 190 | 4.9 | 5 |
| 50/1 | 5%/1.6% | 190 | 4.9 | 11 |
| 50/1 | 5%/1.5% | 160 | 4.9 | None in 65 hrs |
| 50/1 | 5%/1.5% | 190 | 4.9 | 22 |
| 50/1 | 5%/1.3% | 190 | 4.9 | 24 |

In another embodiment, the oxidized starch is present in the amount of up to about 10 wt % of the water. In such embodiments, other polymers in the treatment fluid such as oxidized chitosan-based compounds can serve as crosslinkers to the oxidized starch.

EXAMPLE 4

The results of using oxidized starch as the base polymer and the oxidized chitosan-based compound as the crosslinker are shown in Table 4. The results indicate that the ratio of base polymer to crosslinker as well as the concentration of the two components can be used for optimising the gel times.

TABLE 4

Oxidized Starch as the Base Polymer and Oxidized/Nonoxidized Chitosan as the Crosslinker

| Sample | Crosslinker | % Starch/ % Chitosan-based Compound | Temp (F) | Gel Time(Hrs) |
|---|---|---|---|---|
| 1 | Nonoxidized Chitosan-based Compound | 8/0.2 | 180 | none in 3 day |
| 2 | Nonoxidized Chitosan-based Compound | 2/0.8 | 180 | <than 45 min |
| 3 | Oxidized Chitosan-based Compound | 7/2 | 180 | No gel in 4 days |
| 4 | Oxidized Chitosan-based Compound | 4.9/4.9 | 180 | <30 minutes |
| 5 | Oxidized Chitosan-based Compound | 5/2 | 180 | 3 hrs |
| 6 | Oxidized Chitosan-based Compound | 5/1 | 180 | No gel in 4 days |

The degree of oxidation of the chitosan can be used by those skilled in the art to control gel time. Besides the degree of oxidation of the chitosan, a number of other variables can be used to control gel time, or impact the gelling of the oxidized chitosan-based compound with polymers, whether the oxidized chitosan-based compound is used as the base polymer or as the crosslinker. Such variables include the type of polymer, the crosslinker concentration, the pH of the gel system, the mix water, the temperature of the mix water, the gel thermal stability, and the chitosan modification.

In comparing the ability of polymers to crosslink, or react with the oxidized chitosan-based compound, the order of ease of crosslinking reactivity suggests steric resistance to the approach of the amino group at the amide carbonyl group in copolymers such as PA-t-BA and the sterically similar AMPS®/AA, which may be due to the adjacent bulky groups on these copolymers. Thus, the reactivity of partially hydrolyzed polyacrylamides is higher than the water-soluble compound having carbonyl groups with bulky comonomers such as t-butyl acrylate and AMPS®.

Yet another variable that can be used to control gel time is the pH of the gel system. The crosslinking reaction proceeds with decreasing pH of the gel system. This observation is in accordance with expectations for amine-type crosslinkers. Without being limited by theory, it is believed that the lone pair of electrons on the amine nitrogen groups is expected to be protonated in acidic media, thus making them unavailable to initiate a nucleophilic attack on the water-soluble compound having carbonyl groups. Therefore, gel time can be controlled by varying the pH of the gel system.

Still another variable that can be used to control gel time is the mix water, which is believed to effect the crosslinking reaction. The crosslinking reaction can proceed significantly faster in fresh water compared to seawater. Similar results occur in the crosslinking reactions of the prior art, such as crosslinking reactions of PA-t-BA with PEI.

Therefore, gel time can be controlled by variables such as the degree of oxidation of chitosan-based compound, the pH of the solution (lowering of pH increases gel times due to protonation of amino group in the oxidized chitosan-based compound), and base polymer/crosslinker ratio and the corresponding solution concentrations.

In high temperature applications, the oxidized chitosan-based compound can be used as a crosslinker, which is difficult to achieve with non-oxidized chitosan-based compounds due to very short gel times at such temperatures. It should be noted that gel time with the oxidized chitosan-based compound/acrylamide-based polymer combination appears to be more strongly influenced by temperature than the polymer/crosslinker ratios, or the corresponding concentrations especially at temperatures higher than 200° F., which may be indicative of the sterically hindered environment of the amino group in chitosan. The base polymers have different reactivities with crosslinkers, which allow the selection of suitable water-soluble polymer having carbonyl groups for a wide range of formation temperatures in conformance applications. The oxidized chitosan-based compound/polymer gel system or oxidized chitosan-based compound/starch gel system has thermal stability in the temperature range applicable to many conformance-related applications, making it commercially useful.

EXAMPLE 5

The results from crosslinking reactions using the oxidized chitosan-based compound and the acrylamide-based polymers are presented in Table 5. The results show that some of the amino groups might have been oxidized. The results also suggest that by controlling the degree of oxidation, the gel time can be controlled. The results also suggest the possibility of using the oxidized chitosan-based compound as a crosslinker for high temperature applications, which was not possible with non-oxidized chitosan-based compound due to very short gel time at these temperatures. Surprisingly, the oxidation of the chitosan-based compound made the gelling compositions essentially salt-insensitive.

TABLE 5

Gel Times Polyacrylamide as the Base polymer and Oxidized Chitosan-based Compound as the Crosslinker

| Base Polymer | Crosslinker | Mix Water | % Base polymer/ % Crosslinker | Temp (F) | Gel Time (HRS) |
|---|---|---|---|---|---|
| PA-t-BA | Control | 2% KCl | 7/2 | 180 | <3 days |
| PA-t-BA | HYDAGEN ® HCMF (Oxidized) | 2% KCl | 7/2 | 180 | 4–9 days |
| PA-t-BA | HYDAGEN ® HCMF (Oxidized) | 2% KCl | 7/2 | 180 | <24 hrs |
| PA-t-BA | Vanson Lactate (Oxidized) | 2% KCl | 5/4 | 180 | <3 days |
| PA-t-BA | 9201-25-1 | 2% KCl | 7/2 | 190 | 13 hrs |
| PA-t-BA | 9201-28-3 | 7% KCl | 5/4 | 190 | 16 hrs |
| PA-t-BA | 9201-25-1 | Fresh Water | 5/4 | 190 | 17 hrs |

The well treatment fluid of this invention generally will contain materials well known in the art to provide various characteristics of properties to the fluid. Thus, the well treatment fluid can contain one or more viscosifiers or suspending agents in addition to the oxidized chitosan-based compound, weighting agents, corrosion inhibitors, soluble salts, biocides, fungicides, seepage loss control additives, bridging agents, deflocculants, lubricity additives, shale control additives, pH control additives, and other additives as desired. The well treatment fluid can also contain one or more materials that function as encapsulating or fluid loss control additives to restrict the entry of liquid from the fluid to the contacted shale. Representative materials include partially solubilized starch, gelatinized starch, starch derivatives, cellulose derivatives, humic acid salts (lignite salts); lignosulfonates, gums, biopolymers, synthetic water soluble polymers, and mixtures thereof. If desired, water-soluble potassium compounds can be incorporated into the fluids of this invention to increase the potassium ion content thereof. It is known to add potassium chloride, potassium formate, potassium acetate, and the like to fluids to enhance the shale stabilizing characteristics of the fluids.

Mixtures of chitosan-based compounds and oxidizers can be prepared for addition to the well treatment fluid of this invention for maintenance of the properties thereof, or indeed, for preparing the initially prepared oil and gas well drilling and servicing fluids before adding the fluids of the present invention thereof By oxidizing the chitosan-based compound, the solubility of the chitosan-based compound is increased so as to increase its commercial usefulness, while still retaining the reactivity of the chitosan-based compound.

An improved method of this invention for treating a subterranean formation penetrated by a wellbore is comprised of the following steps: (a) forming a well treatment fluid comprising water, a water-soluble compound having carbonyl groups, and an oxidized chitosan-based compound having the property of being soluble in water at greater than about 2 wt % while maintaining a viscosity of less than about 1000 cp; and (b) contacting the subterranean formation with the well treatment fluid. Tap water is used to measure the solubility of the oxidized chitosan-based compound. In one embodiment, the oxidized chitosan-based compound includes oxidized chitosan. Preferably, the oxidized chitosan-based compound has the property of being soluble in water at a pH of about 4 to about 7 and at STP. In yet another aspect of this embodiment, the oxidized chitosan-based compound has the property of being soluble in water up to at least about 10 wt %.

In one embodiment, contacting the subterranean formation with the well treatment fluid further includes introducing the well treatment fluid into the wellbore penetrating the subterranean formation. As indicated above, the treatment fluid in the present invention is useful in drilling a well wherein there is circulated in a wellbore (borehole) a drilling fluid during the drilling thereof. The well treatment fluid of this invention is circulated or spotted within a borehole during well drilling or servicing operations. The well treatment fluid can be formulated to provide viscous gels to overcome lost circulation problems in a wellbore as is known in the art.

After careful consideration of the specific and exemplary embodiments of the present invention described herein, a person of ordinary skill in the art will appreciate that certain modifications, substitutions and other changes may be made without substantially deviating from the principles of the present invention. The detailed description is illustrative, the spirit and scope of the invention being limited only by the appended Claims.

What is claimed is:

1. A method of treating a subterranean formation penetrated by a wellbore comprising the steps of:
   (a) forming a well treatment fluid comprising:
      (i) water;
      (ii) an oxidized chitosan-based compound having the property of being soluble in water at greater than about 2 wt % while maintaining a viscosity of less than about 1000 cp; and
      (iii) a water-soluble compound having carbonyl groups; and
   (b) contacting the subterranean formation with the well treatment fluid.

2. The method of claim 1, wherein the oxidized chitosan-based compound comprises oxidized chitosan.

3. The method of claim 2, wherein the oxidized chitosan has the property of being soluble in water up to about 10 wt %.

4. The method of claim 2, wherein the oxidized chitosan has the property of being soluble in water at a pH of about 4 to about 7.

5. The method of claim 2, wherein the oxidized chitosan has the property of being soluble in water at a pH in the range of about 4 to about 7 and at STP.

6. The method of claim 5, wherein the oxidized chitosan has the property of being soluble in water up to about 10 wt %.

7. The method of claim 2 or 6, wherein the water for the well treatment fluid is selected from the group consisting of fresh water, a natural brine, seawater, and a formulated brine, 2% KCl solution, and any mixtures in any proportion thereof.

8. The method of claim 2 or 6, further comprising the step of obtaining the oxidized chitosan by oxidizing a chitosan using an oxidizer selected from the group consisting of sodium hypochlorite, sodium periodate, hydrogen peroxide, sodium persulfate, sodium chlorite, organic peroxides, peracetic acid, and any mixture in any proportion thereof.

9. The method of claim 2 or 6, wherein the chitosan further comprises chitosan-based compounds selected from the group consisting of chitosan with 0% to 30% acetyl groups, chitosan salts with mineral or organic acids and any mixtures in any proportion thereof.

10. The method of claim 2 or 6, wherein the water-soluble compound having carbonyl groups comprises an acrylamide-based polymer.

11. The method of claim 10, wherein the oxidized chitosan is present in the amount of up to about 10 wt % of the water.

12. The method of claim 10, wherein the acrylamide-based polymer is present in the amount of up to about 10 wt % of the water.

13. The method of claim 2 or 6, wherein the acrylamide-based polymer is selected from the group consisting of polyacrylamide (PHPA); a copolymer of acrylamide and t-butyl acrylate (PA-t-BA); acrylic acid/2-acrylamido-2-methylpropanesulfonic acid copolymer; and any mixtures in any proportion thereof.

14. The method of claim 10, wherein the ratio of the oxidized chitosan to the acrylamide-based polymer is from about 15:1 to about 1:15.

15. The method of claim 2 or 6, wherein the water-soluble compound having carbonyl groups comprises an oxidized starch.

16. The method of claim 15, wherein the oxidized starch is obtained by oxidizing a starch using an oxidizer selected from the group consisting of sodium hypochlorite, sodium periodate, hydrogen peroxide, sodium persulfate, sodium chlorite, organic peroxides, peracetic acid, and any mixtures in any proportion thereof.

17. The method of claim 16, wherein the starch is selected from the group consisting of corn starch, potato starch, waxy maize, dextrinized starch and any mixtures in any proportion thereof.

18. The method of claim 15, wherein the oxidized chitosan is present in the amount of up to about 10 wt % of the water.

19. The method of claim 15, wherein the oxidized starch is present in the amount of up to about 10 wt % of the water.

20. The method of claim 15, wherein the ratio of the oxidized chitosan to the oxidized starch is from about 1:20 to about 20:1.

21. The method of claim 2 or 6, wherein forming the well treatment fluid further includes the step of crosslinking the chitosan with the carbonyl compound.

22. The method of claim 2 or 6, wherein contacting the subterranean formation with the well treatment fluid further includes introducing the well treatment fluid into the wellbore penetrating the subterranean formation.

23. A well treatment fluid for use in a well, the well treatment fluid comprising:
    (a) water:
    (b) an oxidized chitosan-based compound comprising oxidized chitosan and having the property of being soluble in water at greater than about 2 wt % while maintaining a viscosity of less than about 1000 cp; and
    (c) a water-soluble compound having carbonyl groups comprising an acrylamide-based polymer.

24. A well treatment fluid for use in a well, the well treatment fluid comprising:
    (a) water:
    (b) an oxidized chitosan-based compound comprising oxidized chitosan and having the property of being soluble in water at a pH in the range of about 4 to about 7 and at STP at greater than about 2 wt % and up to about 10 wt %, while maintaining a viscosity of less than about 1000 cp; and
    (c) a water-soluble compound having carbonyl groups comprising an acrylamide-based polymer.

25. The well treatment fluid of claim 23 or 24, wherein the oxidized chitosan is present in the amount of up to about 10 wt % of the water.

26. The well treatment fluid of claim 23 or 24, wherein the acrylamide-based polymer is present in the amount of up to about 10 wt % of the water.

27. The well treatment fluid of claim 23 or 24, wherein the ratio of the oxidized chitosan to the acrylamide-based polymer is from about 15:1 to about 1:15.

28. The well treatment fluid of claim 23 or 24, wherein the acrylamide-based polymer is selected from the group consisting of polyacrylamide (PHPA): a copolymer of acrylamide and t-butyl acrylate (PA-t-BA); acrylic acid/2-acrylamido-2-methylpropanesulfonic acid copolymer; and mixtures thereof.

29. A well treatment fluid for use in a well, the well treatment fluid comprising:
    (a) water;
    (b) an oxidized chitosan-based compound comprising oxidized chitosan and having the property of being soluble in water at greater than about 2 wt % while maintaining a viscosity of less than about 1000 cp: and
    (c) a water-soluble compound having carbonyl groups comprising an oxidized starch.

30. A well treatment fluid for use in a well, the well treatment fluid comprising:
    (a) water;
    (b) an oxidized chitosan-based compound comprising oxidized chitosan and having the property of being soluble in water at a pH in the range of about 4 to about 7 and at STP at greater than about 2 wt % and up to about 10 wt %, while maintaining a viscosity of less than about 1000 cp; and
    (c) a water-soluble compound having carbonyl groups comprising an oxidized starch.

31. The well treatment fluid of claims 29 or 30, wherein oxidized chitosan is present in the amount of up to 10 wt % of the water.

32. The well treatment fluid of claims 29 or 30, wherein the oxidized starch is present in the amount of up to about 10 wt % of the water.

33. The well treatment fluid of claims 29 or 30, wherein the ratio of the oxidized chitosan to the oxidized starch is from about 1:20 to about 20:1.

34. A well treatment fluid for use in a well, the well treatment fluid comprising:
    (a) water;
    (b) an oxidized chitosan-based compound having the property of being soluble in water at greater than about 2 wt % while maintaining a viscosity of less than about 1000 cp: and
    (c) a water-soluble compound having carbonyl groups comprising an acrylamide-based polymer.

35. The well treatment fluid of claim 34, wherein the acrylamide-based polymer is present in the amount of up to about 10 wt % of the water.

36. The well treatment fluid of claim 34, wherein the oxidized chitosan-based compound comprises oxidized chitosan, and the oxidized chitosan is present in the amount of up to about 10 wt % of the water.

37. The well treatment fluid of claim 36, wherein the ratio of the oxidized chitosan to the acrylamide-based polymer is from about 15:1 to about 1:15.

38. The well treatment fluid of claim 34, wherein the acrylamide-based polymer is selected from the group consisting of polyacrylamide (PHPA); a copolymer of acrylamide and t-butyl acrylate (PA-t-BA): acrylic acid/2-acrylamido-2-methylpropanesulfonic acid copolymer and mixtures thereof.

* * * * *